(12) United States Patent
O'Hora

(10) Patent No.: US 6,709,355 B2
(45) Date of Patent: Mar. 23, 2004

(54) CONTINUOUSLY VARIABLE TRANSMISSION

(76) Inventor: Gerard M. O'Hora, 1691 Commonwealth Ave., Apt. 18, Brighton, MA (US) 02135

(*) Notice: Subject to any disclaimer, the term of this patent is extended or adjusted under 35 U.S.C. 154(b) by 0 days.

(21) Appl. No.: 10/058,605

(22) Filed: Jan. 28, 2002

(65) Prior Publication Data

US 2003/0144105 A1 Jul. 31, 2003

(51) Int. Cl.[7] ............................. F16H 15/04; F16H 3/22
(52) U.S. Cl. ........................... 475/193; 74/348; 476/6
(58) Field of Search ................... 475/193, 194; 74/348, 349, 340; 476/31, 6, 33

(56) References Cited

U.S. PATENT DOCUMENTS

| | | | |
|---|---|---|---|
| 3,623,376 A | 11/1971 | Call | |
| 5,390,558 A | 2/1995 | Weinberg | |
| 6,066,061 A | 5/2000 | Yun | |
| 6,152,844 A | 11/2000 | Daugherty | |
| 6,257,083 B1 | 7/2001 | Brannon | |
| 6,321,613 B1 * | 11/2001 | Avidor | 74/348 |
| 6,343,521 B1 * | 2/2002 | Brannon | 74/349 |
| 6,499,373 B2 * | 12/2002 | Van Cor | 74/349 |

FOREIGN PATENT DOCUMENTS

| | | | |
|---|---|---|---|
| DE | 19726695 A1 * | 1/1999 | ............. F16H/3/42 |
| EP | 0800019 A1 * | 10/1997 | ........... F16H/15/16 |

OTHER PUBLICATIONS

International publication WO 95/33146 published Dec.–1995.*

* cited by examiner

Primary Examiner—Tisha D. Lewis
(74) Attorney, Agent, or Firm—John J. Elnitski, Jr.

(57) ABSTRACT

A Continuously Variable Transmission (CVT) that uses a gear which changes gear size, along with an innovative gear train to achieve different gear ratios. The CVT overcomes the disadvantages of other designs, as it is a purely mechanical drive system. The CVT is an electro-hydraulically operated device, allowing infinite precision and control, using custom configurations, based on information from engine management systems installed in most modern vehicles. The CVT provides improved vehicle fuel efficiency, acceleration, ease of vehicle drivability and increased power transfer. The CVT minimizes engine stress due to a lower range of revolutions. Also, stress on the vehicle's drive-train is minimized, as there is no sudden transition in drive-shaft RPM as the gears change. The CVT allows an engine to run at an optimal range for fuel efficiency and torque, as the engine no longer has to cycle through the normal range of revs as the gears change.

20 Claims, 11 Drawing Sheets

CONTINUOUSLY VARIABLE TRANSMISSION

BACKGROUND

The present invention generally relates to transmissions which transmit power generated by a power source to an output having a load. More specifically, the present invention relates to a continuously variable transmission that includes a gear having a varying size that can be employed in vehicles, as well as other applications.

A transmission is known to convert and transmit power generated by a source to accommodate a load placed on an output of the transmission. Manual transmissions used in vehicles utilize a hand-operated shift lever and foot-operated clutch to enable manually shifting among various gear ratios of the transmission. Automatic transmissions eliminate the combined use of the clutch and shift lever, but result in a loss of efficiency during the transfer of power, as compared to manual transmissions. It is desirable to have a transmission with a continuous, infinite range of gear ratios to more efficiently respond to the various loads placed on the output, but can be operated by a user with the simplicity of an automatic transmission. Such transmissions are know as continuously variable transmissions. It has long been recognized that a continuously variable transmission has the potential to improve a number of different systems utilizing a rotary power source, such as an engine or motor. Compared to common transmissions that have a discrete number of "steps" or gear ratios, the "stepless" performance of an ideal continuously variable transmission should improve efficiency in many applications. The disadvantage with current continuously variable transmissions is that most of them employ belts to complete the drive-train or friction clutches to perform gear ratio changes, or even hydraulic pumps to propel a vehicle. Another disadvantage with current manual continuously variable transmissions in vehicles is the undesirable stress on the engine and drive train, due to poor operation by the driver.

It is an object of the present invention to provide a continuously variable transmission which is a purely mechanical drive system within the transmission housing.

It is another object of the present invention to provide a continuously variable transmission that has a numerous range of gear ratios to more efficiently respond to the various loads placed on the transmission of a vehicle.

SUMMARY OF THE INVENTION

A continuously variable transmission that includes an input connected to a power source, at least one conical shaped gear, at least one variable ratio gear and at least one variable ratio gear adjustment device for each at least one variable ratio gear. The variable ratio gear engages the conical shaped gear and the variable ratio gear is able to change gear size along the conical shaped gear. The variable ratio gear adjustment device interacts with the variable ratio gear to change the gear size. The variable ratio gear can be a ring shaped collar with an open center and include adjustable gear teeth, which change the gear size of the variable ratio gear. The variable ratio gear adjustment device can be a conical shaped device which inserts into the open center of the collar, such that the collar moves along a height of the conical shaped device to change gear size.

DETAILED DESCRIPTION

The present invention is a Continuously Variable Transmission (CVT). The CVT of the present invention overcomes the disadvantages of other designs, as it is a purely mechanical drive system. The CVT uses a gear which changes gear size, along with an innovative gear train to achieve different gear ratios. The CVT is an electro-hydraulically operated device, allowing infinite precision and control, using custom configurations, based on information from the engine management system installed in most modern vehicles. The CVT provides improved vehicle fuel efficiency, acceleration, ease of vehicle drivability and increased power transfer, when compared to most automatic transmissions. The CVT minimizes engine stress due to a lower range of revolutions. Also, stress on the vehicle's drive-train is minimized, as there is no sudden transition in drive-shaft RPM as the gears change. The CVT allows an engine to run at an optimal range for fuel efficiency and torque, as the engine no longer has to cycle through the normal range of revs as the gears change. The CVT of the present invention can be applied to other applications, as well as vehicles.

Figure 1:
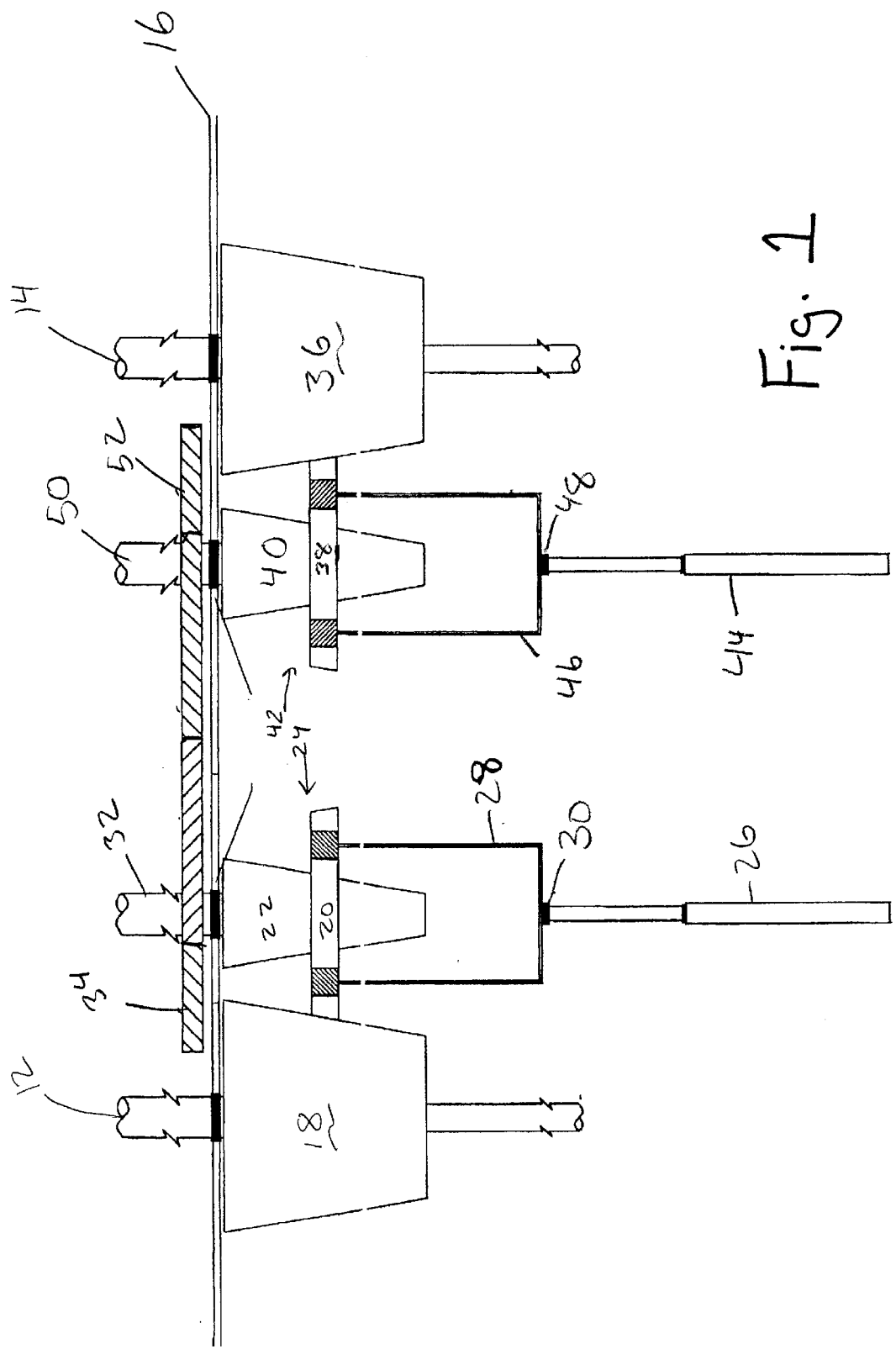
FIG. 1 is a schematic view of components of a transmission according to the present invention.

FIG. 1 shows a simple version of the CVT, according to the present invention. As shown in FIG. 1, there is an input 12 to the CVT from a power source and an output 14 from the CVT, both extending from a transmission housing 16. The input 12 and output 14 are shown as shafts, typically used with vehicles. The transmission housing 16 contains the following components of the CVT. An input conical gear 18 connected to and turned by the input 12. An input variable ratio gear 20 connected to and turned by the input conical gear 18. The input variable ratio gear 20 being adjustable in gear size as it relates to the input conical gear 18. A variable ratio gear adjustment device 22, whereby the movement of the input variable ratio gear 20 along the variable ratio gear adjustment device 22 adjusts the size of input variable ratio gear 20. Together the input variable ratio gear 20 and the variable ratio gear adjustment device 22 form an input Continually Variable Gear 24 (CVG). A ram 26 connected with an independently rotating hollow shaft 28 by a thrust bearing 30. The hollow shaft 28 connected to and rotating with the input variable ratio gear 20. A variable ratio gear adjustment device shaft 32 extending from the variable ratio gear adjustment device 22. The variable ratio gear adjustment device shaft 32 also extending out from transmission housing 16 and connected to an input transfer gear 34. An output conical gear 36 connected to and turning the output 14. An output variable ratio gear 38 connected to and turning the output conical gear 36. The output variable ratio gear 38 being adjustable in gear size as it relates to the output conical gear 36. A variable ratio gear adjustment device 40, whereby the movement of the output variable ratio gear 38 along the variable ratio gear adjustment device 40 adjusts the size of output variable ratio gear 38. Together the output variable ratio gear 38 and the variable ratio gear adjustment device 40 form an output CVG 42. A ram 44 connected with an independently rotating hollow shaft 46 by a thrust bearing 48. The hollow shaft 46 connected to and rotating with the output variable ratio gear 38. A variable ratio gear adjustment device shaft 50 extending from the variable ratio gear adjustment device 40. The variable ratio gear adjustment device shaft 50 also extending out from transmission housing 16 and connected to an output transfer gear 52.

Figure 2:
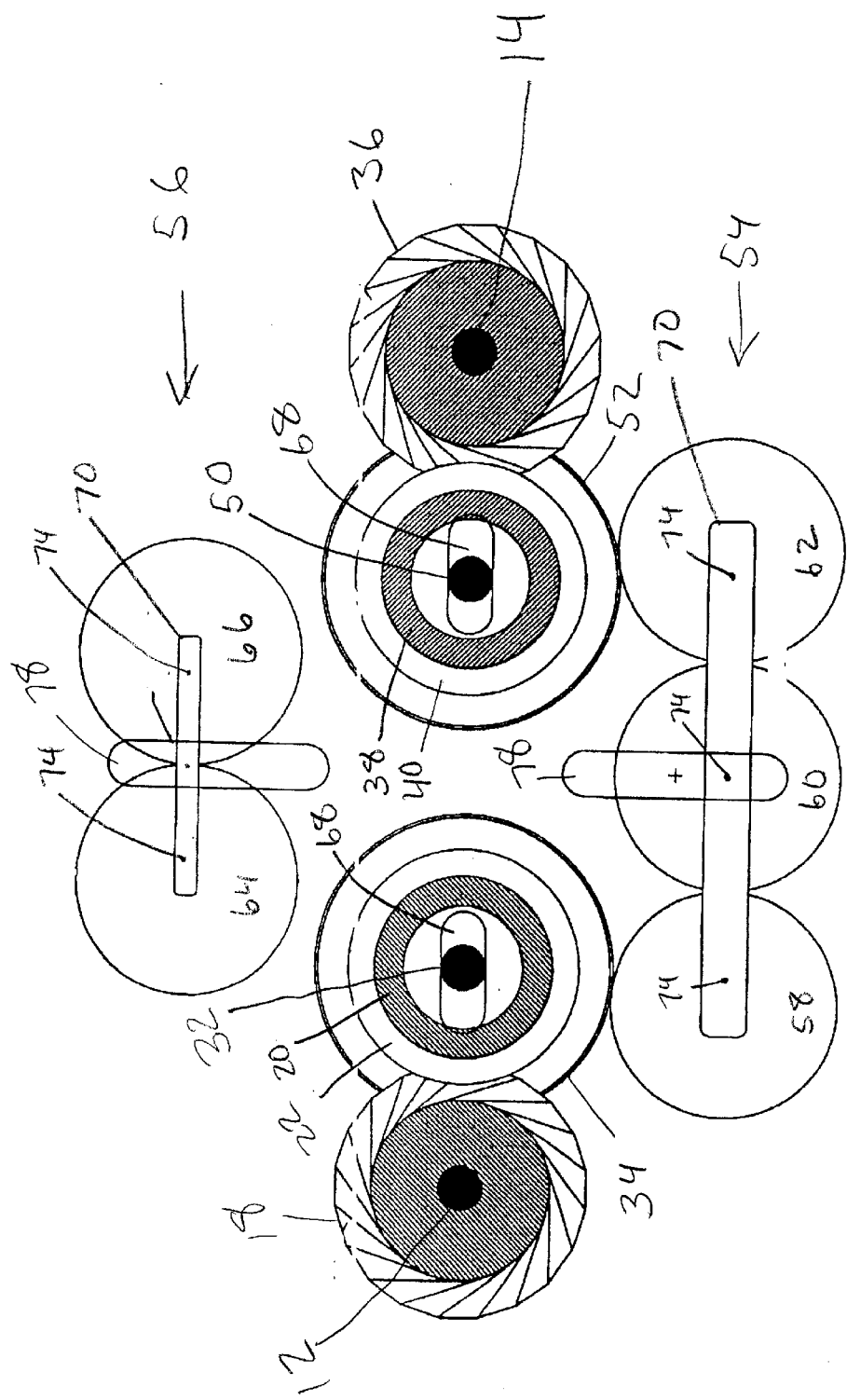
FIG. 2 is a schematic view of gear trains of the transmission of FIG. 1 according to the present invention.
Figure 3:
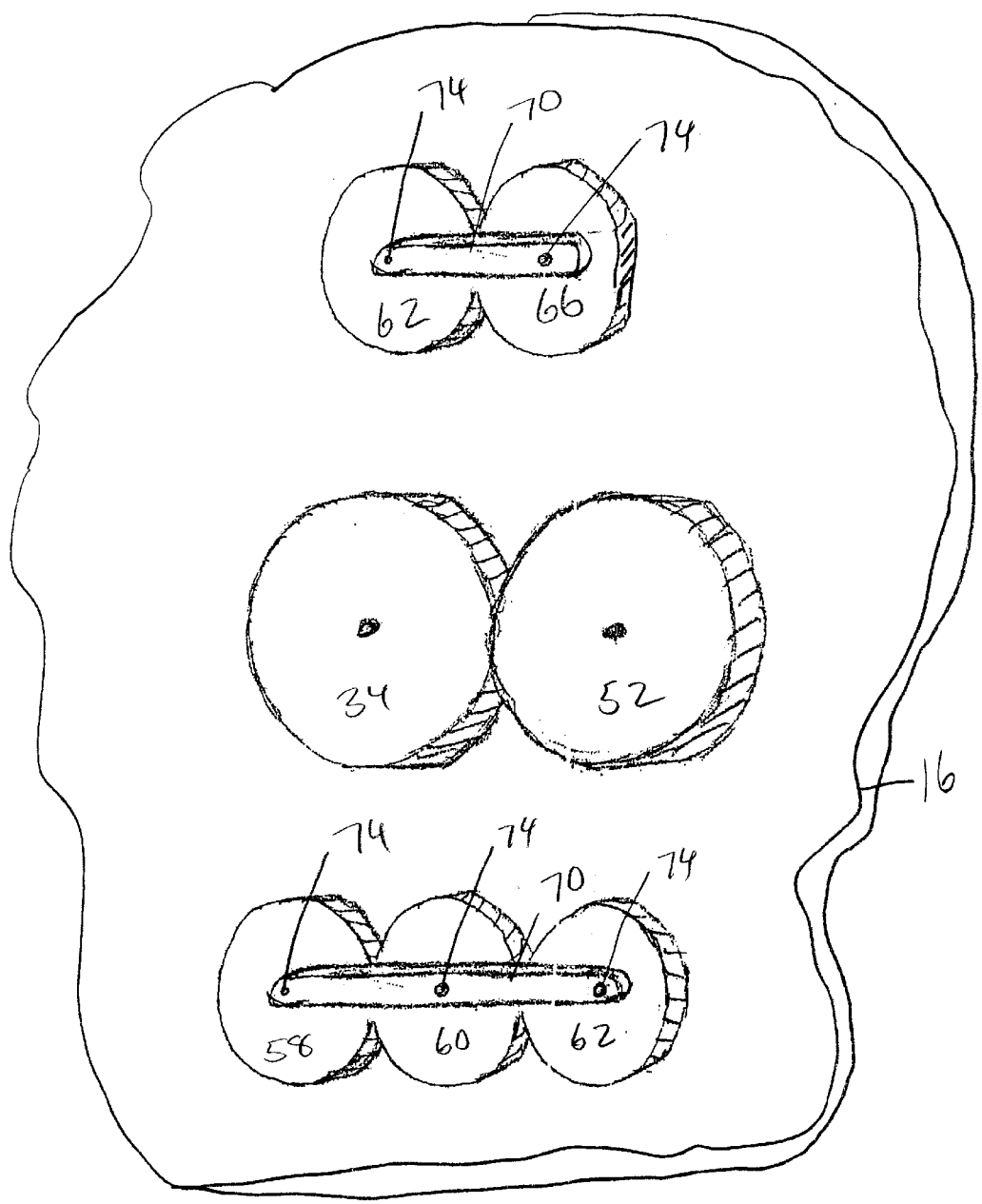
FIG. 3 is a perspective view of gear trains of FIG. 2 according to the present invention.
Figure 4:
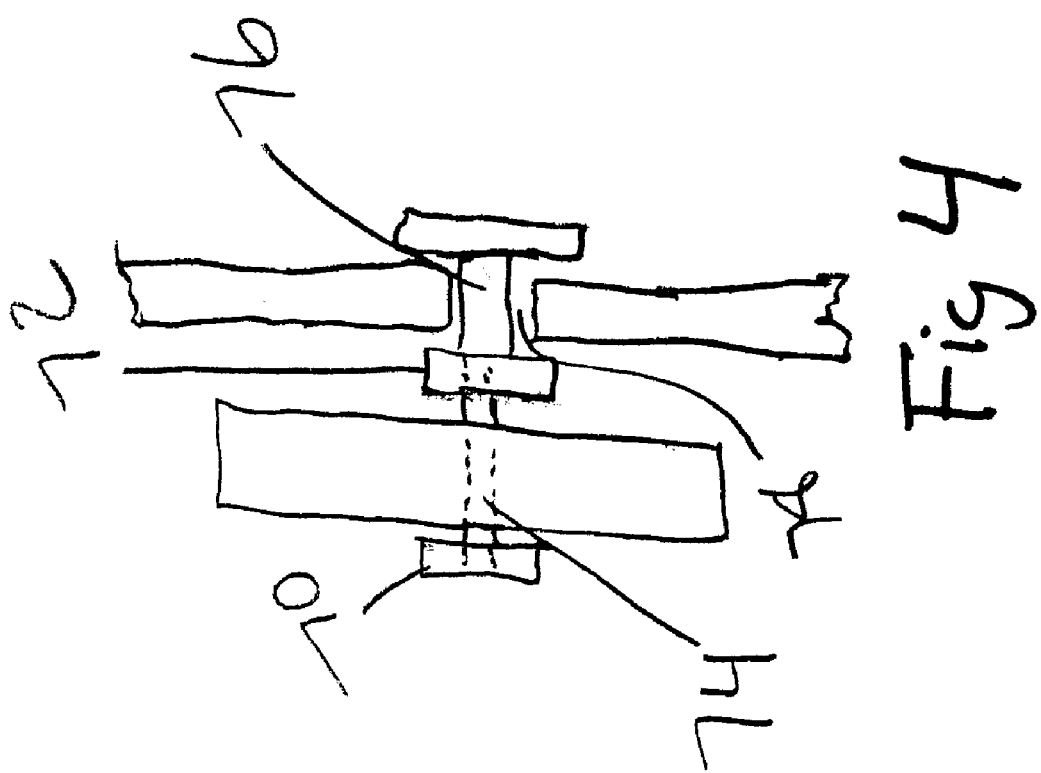
FIG. 4 is a side view of a gear train according to the present invention.

FIGS. 2–4 show a directional gear system which interacts between the input and output transfer gears 34, 52 to determine rotational direction of the shaft of the output 14 in relation to the rotation of the shaft of the input 12. FIGS. 2–4 show the directional gear system with a odd number gear train 54 and a even number gear train 56. Whereby, the odd number gear train 54 always has an odd number of gears and the even number gear train 56 always has an even number of gears. The odd number gear train 54 is shown with three gears 58, 60, 62 and the even number gear train 56 is shown with two gears 64, 66. By using a mechanical method (not shown) attached to the odd and even number gear trains 54, 56 either the odd or even number gear train 54, 56 can be positioned between the input and output transfer gears 34, 52 to engage the input and output transfer gears 34, 52. When the odd number gear train 54 engages the input and output transfer gears 34, 52, the gear 58 is rotated by the input transfer gear 34 and gear 58 in turn rotates the gear 60. Gear 60 rotates the gear 62 and gear 62 in turn rotates the output transfer gear 52. When the even number gear train 56 engages the input and output transfer gears 34, 52, the gear 64 is rotated by the input transfer gear 34 and gear 64 in turn rotates the gear 66. Gear 66 rotates the output transfer gear 52. As shown, the odd gear train 54 causes the shaft of the output 14 to rotate in the same direction as the shaft of the input 12. While, the even gear train 56 causes the shaft of the output 14 to rotate in the opposite direction of the shaft of the input 12.

Figure 5:
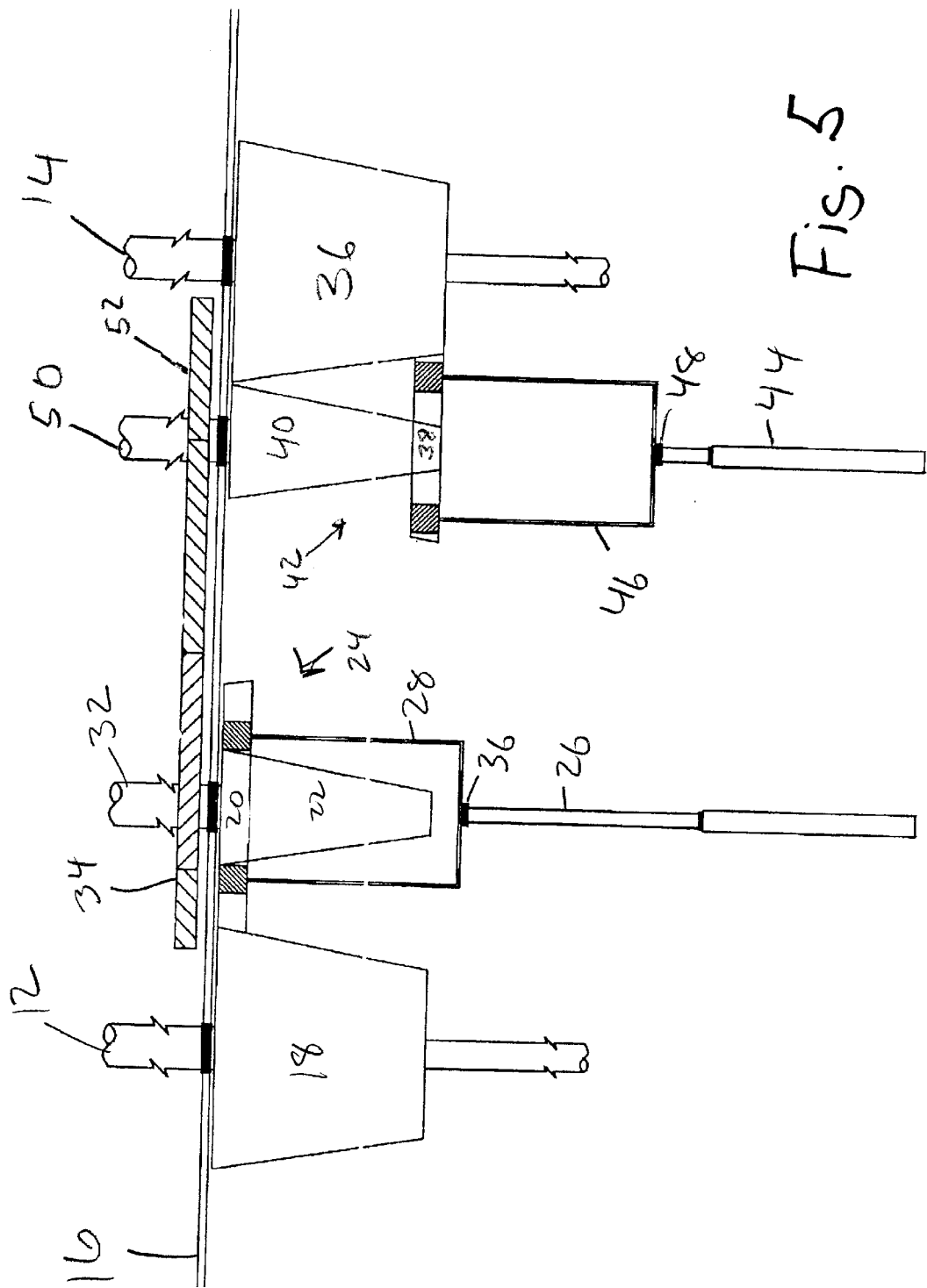
FIG. 5 is a schematic view of the transmission of FIG. 1 with a different gear ratio according to the present invention.
Figure 6:
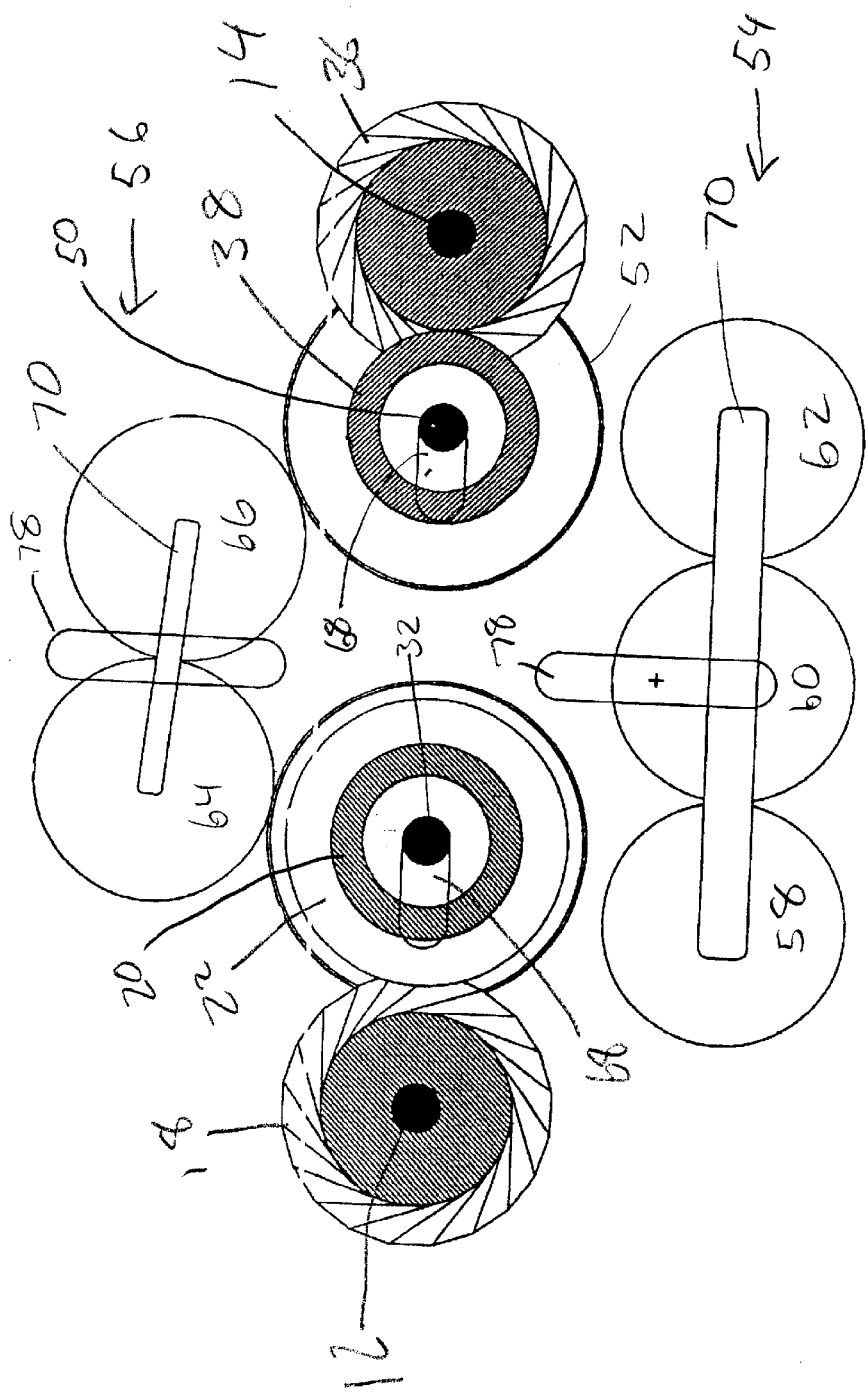
FIG. 6 is a schematic view of gear trains of the transmission of FIG. 5 according to the present invention.

The transmission housing 16 of FIG. 1 includes guide tracks for the variable ratio gear adjustment device shafts 32, 50 and the odd and even number gear trains 54, 56, as shown in FIGS. 2–3. The variable ratio gear adjustment device shafts 32, 50 ride in CVG guide tracks 68 formed in the transmission housing 16. The CVG guide tracks 68 allow the input and output CVGs 24, 42 to move in the X-direction. The movement of the CVGs 24, 42 allows for smooth gear ratio changes as the input and output variable ratio gears 20, 38 change gear size. The odd and even number gear trains 54, 56 are shown assembled in FIGS. 2–3. Each gear train 54, 56 includes a top stabilizer link 70 and a bottom stabilizer link 72, which retain the gears 58, 60, 62, 64, 66 in place and maintain the connection between the gears 58, 60, 62, 64, 66 of the gear trains 54, 56. Each gear 58, 60, 62, 64, 66 of each gear train 54, 56 includes a rotational axle 74 at the center of the gear 58, 60, 62, 64, 66. The rotational axle 74 of the gears 58, 60, 62, 64, 66 are connected between the two stabilizer links 70, 72 of each gear train 54, 56, as shown by the example of FIG. 4. Whereby, the stabilizer links 70, 72 retain the gears 58, 60, 62, 64, 66 in position and move the gears 58, 60, 62, 64, 66 of the gear trains 54, 56 as a unit. A guide shaft 76 extends from the mid-point of the bottom stabilizer link 72 of each gear train 54, 56, as shown by the example of FIG. 4. The guide shaft 76 is retained in a gear train guide tracks 78, so that the gear trains 54, 56 may ride along the gear train guide tracks 78 in the Y-direction. When one of the gear trains 54, 56 is to be used, the gear train 54, 56 is moved toward the input and output transfer gears 34, 52 to engage the input and output transfer gears 34, 52. The gear trains 54, 56 are allowed to pivot about the Z-direction to account for different gearing ratios. FIGS. 1–2 show a 1:1 gear ratio with the odd number gear train 54 engaged, while FIGS. 5–6 show a 1:1.42 gear ratio with the even number gear train 56 engaged. As can be seen in FIG. 5, the CVGs 24, 42 are in different positions to provide the 1:1.42 gear ratio, as compared to the CVGs 24, 42 in FIG. 1 for the 1:1 gear ratio. FIG. 6 shows the even number gear train 56 pivoted to accommodate the different positioning of the CVGs 24, 42.

Figure 7:
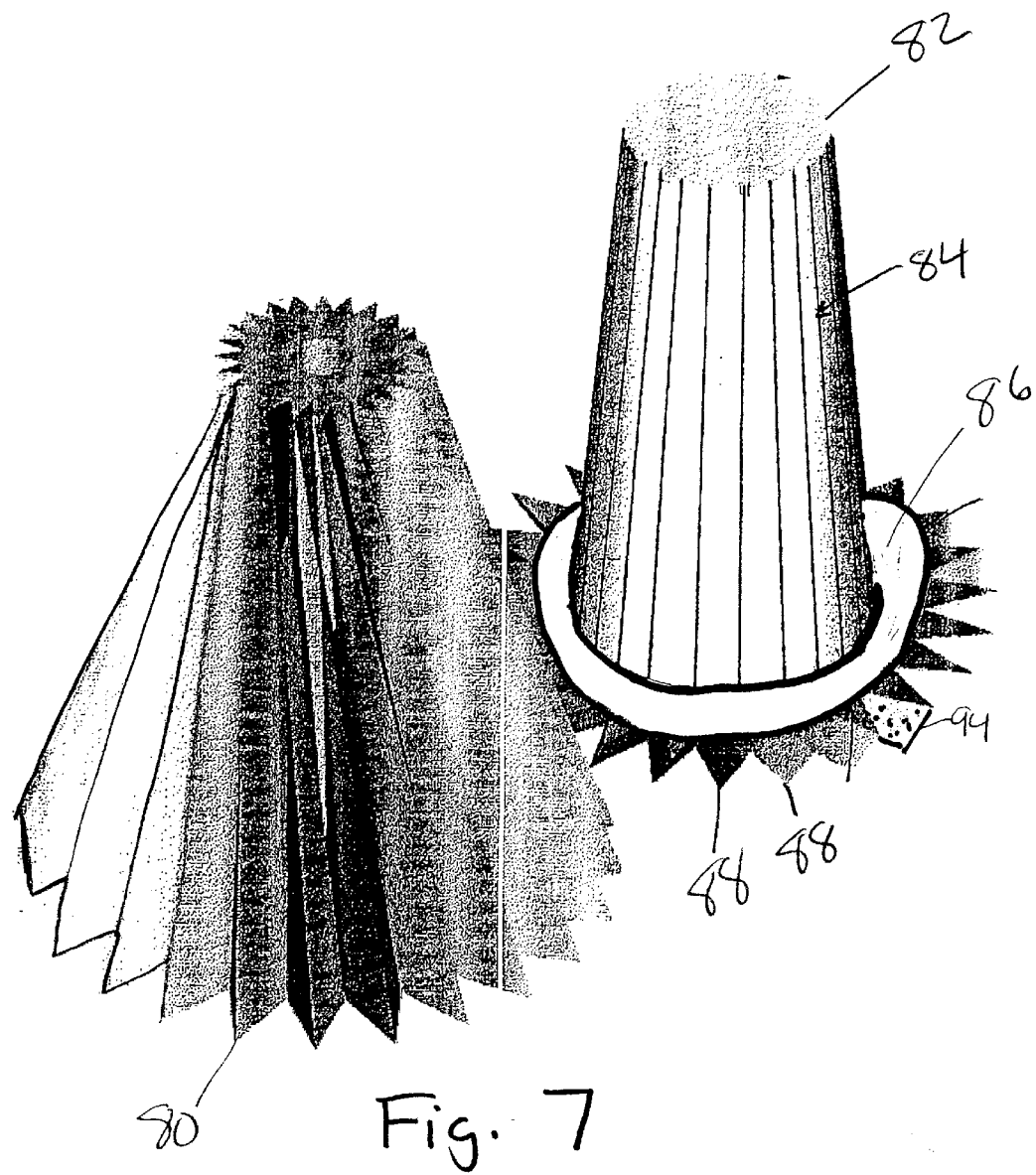
FIG. 7 is a perspective view of a CVG according to the present invention.
Figure 8:
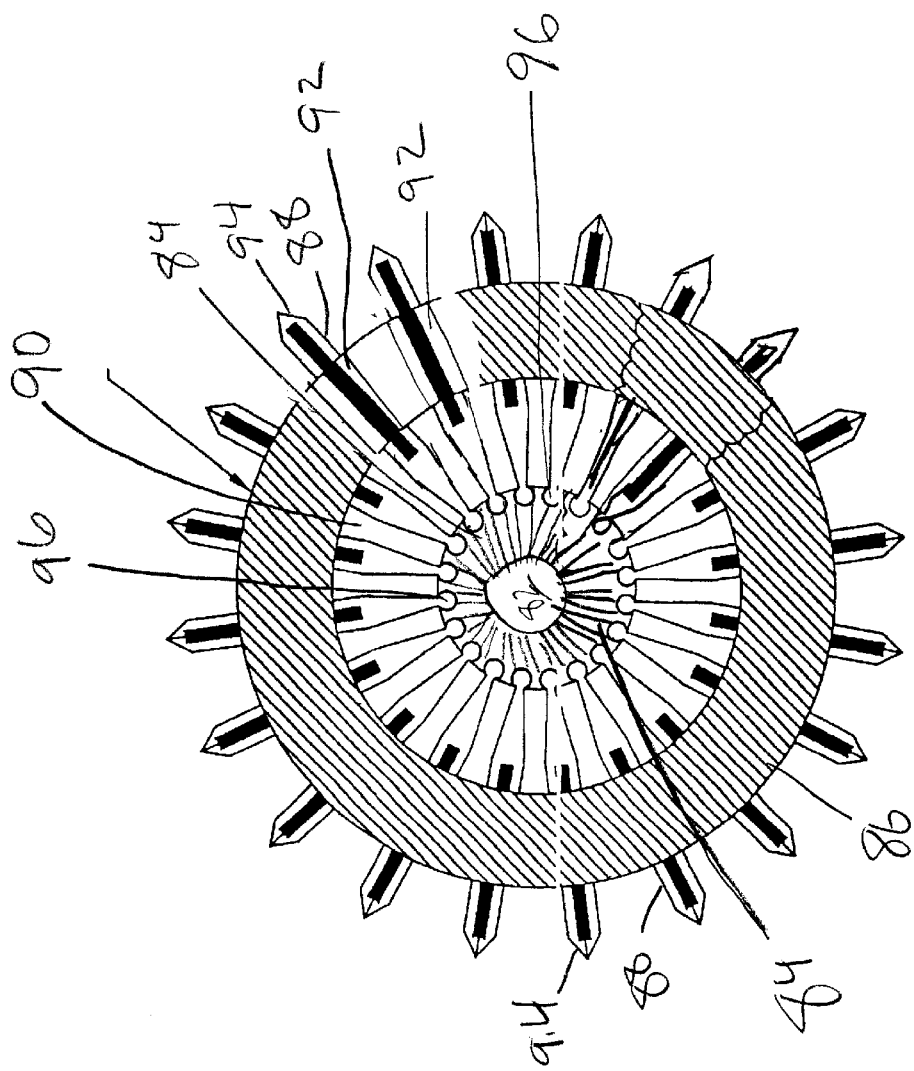
FIG. 8 is a bottom view of a CVG according to the present invention.
Figure 9:
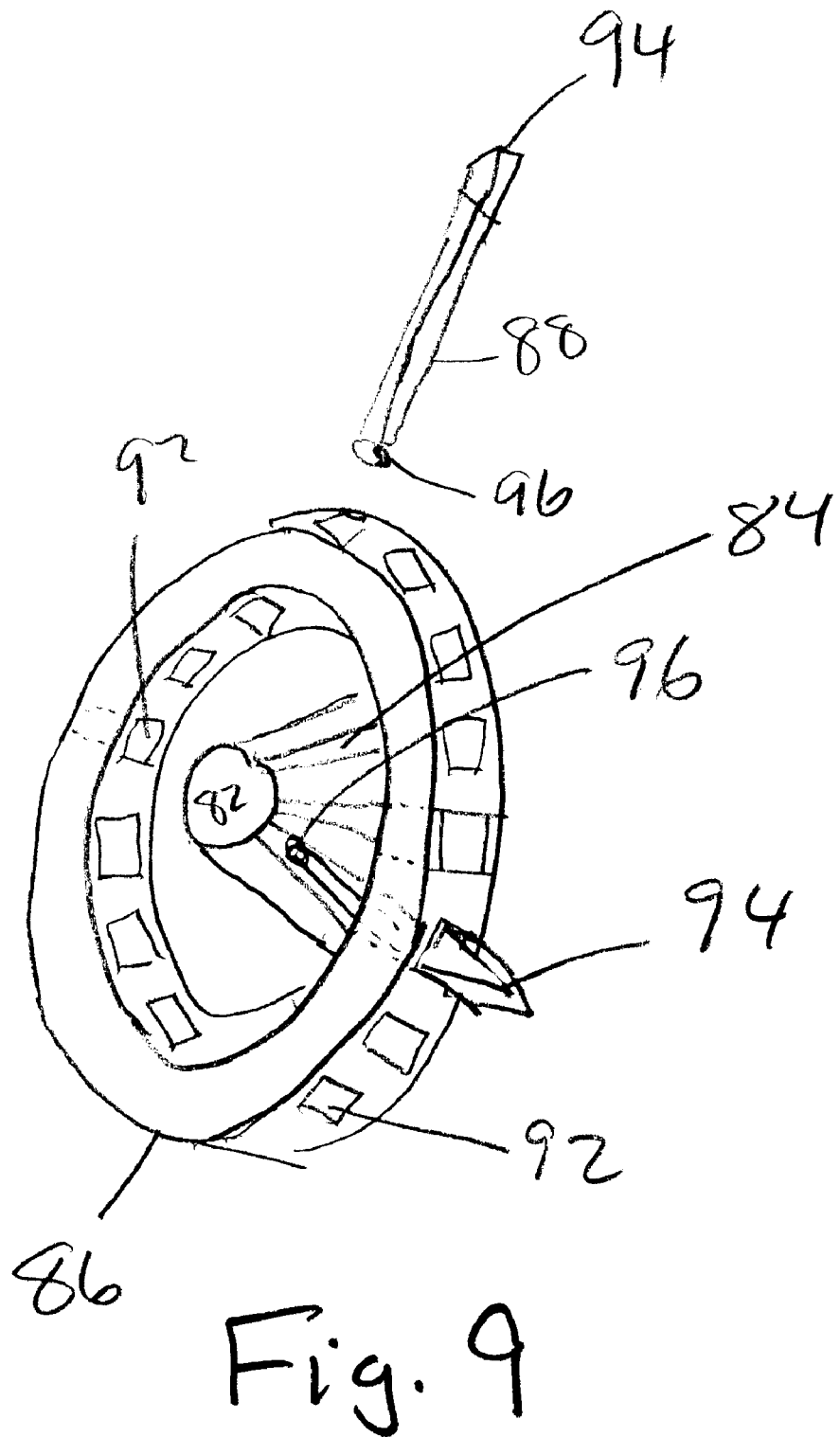
FIG. 9 is a perspective view of a variable ratio gear according to the present invention.

FIGS. 7–9 show an embodiment of the conical gear and CVG which can be implemented in the CVT. FIG. 7 shows the conical gear as a conically shaped helical gear 80. FIGS. 7–9 show the CVG made up of a variable ratio gear adjustment device and a variable ratio gear. The variable ratio gear adjustment device is shown as a conical shaped solid 82 with pin slots 84. The pin slots 84 run along the height of the conical shaped solid 82. The variable ratio gear is shown as a collar 86 with sliding pins 88. The collar 86 is a ring with an open center 90 that slips over the variable ratio gear adjustment device. The collar 86 includes ring slots 92 about the collar 86 which retain the sliding pins 88 in the collar 86, yet allows the sliding pins 88 to slide in and out the ring slots 92. A low friction, high wear resistance material or a set of roller bearings can be employed between the sliding pins 88 and the ring slots 92 to reduce frictional forces. The collar 86 provides strength to the sliding pins 88, as the sliding pins 88 are extended outward. Each sliding pin 88 has a tooth end 94 and a slot end 96. The slot end 96 of the sliding pins 88 face inward into the open center 90 of the collar 86. The slot ends 96 engage the pin slots 84 of the variable ratio gear adjustment device. The pin slots 84 also prevent the sliding pins 88 from slipping due to centrifugal forces. The tooth end 94 of the sliding pins 88 act as gear teeth, which engage the teeth of the conically shaped helical gear 80.

The CVT as shown in FIGS. 1–6 operates with the CVG and the conically shaped helical gear 80 of FIGS. 7–9 for the input and out CVGs 24, 42 and conical gears 18, 36 as follows. The movement of the sliding pins 88 in the collar 86 of the variable ratio gear allows for a varying ratio. The varying ratio is controlled by the variable ratio gear adjustment device. As the collar 86 is pushed upward along the height and towards the larger diameter of the conical shaped solid 82 by the rams 26, 44 and rotating hollow shafts 28, 46, the sliding pins 88 are pushed radially outwards from the collar 86. Thereby, increasing the diameter and hence the ratio of the variable ratio gear. Similarly, the diameter of the variable ratio gear decreases when the variable ratio gear is withdrawn from the variable ratio gear adjustment device. The diameter size of the collar 86 determines how much stress the sliding pins 88 must cope with, but also effects the overall ratio of the system. The ratio of the system is determined by the diameter of the collar 86, which is the smallest gear diameter, and the length of the sliding pins 88 plus the maximum size of the variable ratio gear (largest gear diameter). The minimum diameter of the variable ratio gear plus twice the length of the sliding pins 88 will equal the overall minimum diameter of the gear (collar diameter 86). So, as the variable ratio gear travels along the variable ratio gear adjustment device, the CVG varies in diameter and pitch. This allows the CVG it to match the change in diameter and pitch of the conically shaped helical gear 80. Since the diameter of the CVG is changing, the CVG must move along a path to keep in continual contact with conically shaped helical gear 88. This path is the CVG guide tracks 66, which can employ a low friction, high wear resistance material or a set of roller bearings against the variable ratio gear adjustment device shafts 32, 50. The combination of the conically shaped helical gear 80 and the CVG by itself has no effect on the Input/Output ratio of a power source. That is why the conically shaped helical gear 80 and the CVG must be mirrored, so as one CVG is at a minimum ratio, the second CVG is at a maximum and hence an overall increase or decrease in RPM of the power source is achieved. CVGs must be geared together, which is why the gear trains 54, 56 must be used. The gear trains 54, 56 allow for forward and reverse rotation the shaft of the output 14. Each gear train 54, 56 is allowed to pivot to take into consideration the CVG's lateral movement.

For vehicles, an overall ratio of 0.7:1:1.42 may be achieved with the CVT. Since most modern cars have a ratio of 2.3:1:0.9, two such CVTs may be joined in series or fixed gearing may be used to change the input RPM while in forward in motion, and a different gear ratio for reverse. The use of two CVTs in series will give much greater range of I/O ratios when compared to most modern transmissions. This would be useful for high load applications where low gearing is required to start the vehicle moving or for control, but gradually allowing the system to increase velocity without disengaging the power from the wheels and placing high stress on the transmission, when the clutch is reengaged. In order for the present invention to work, electrical signals from an on-board computer and hydraulic pressure from the power source is required. The electrical signals are already being processed on most modern engines of vehicles. The electrical signals are used to calculate the ratio of fuel and air going to the engine and the efficiency of the engine from samples taken from the exhaust. Add to this information another column or data field and one could control the CVT in a number of ways. Select an economy mode, whereby the I/O ratio of the CVT is changed to allow for maximum engine efficiency. Select a performance mode which allows maximum acceleration. Use a number of presets, so that the driver can manually select what 'gear' the vehicle is operating. Hence, the control of a CVT would be quite similar to modern automatic transmissions, such as the "TIPTRONIC" concept, except it has all the benefits of a manual transmission. The hydraulic pressure will be used to actuate the rams that will move the position of the various gears. Using solenoid valves or other electronic flow control devices, the volume of fluid and hence the amount of gear movement can be accurately controlled.

Figure 10:
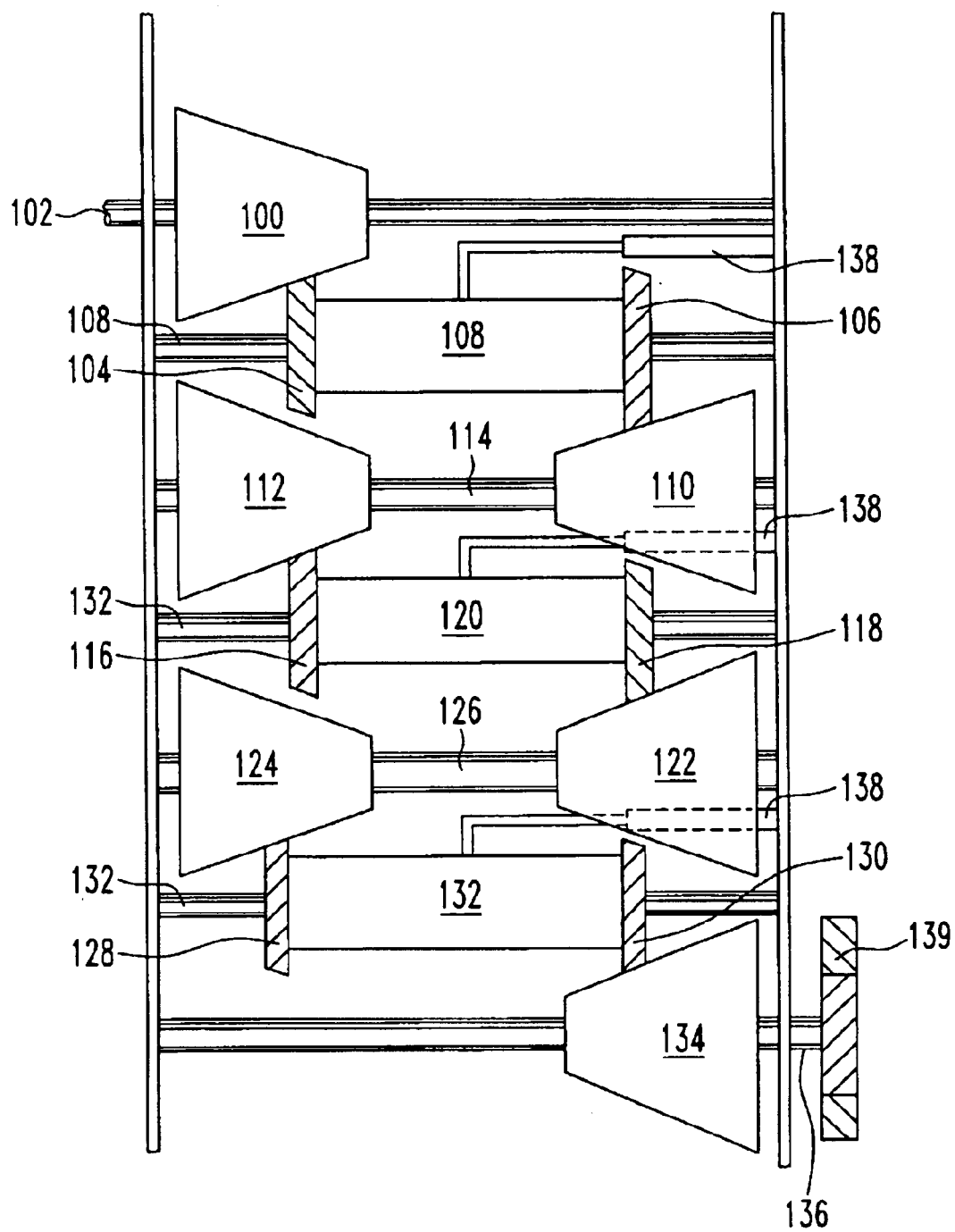
FIG. 10 is a schematic view of components of another transmission according to the present invention.
Figure 12:
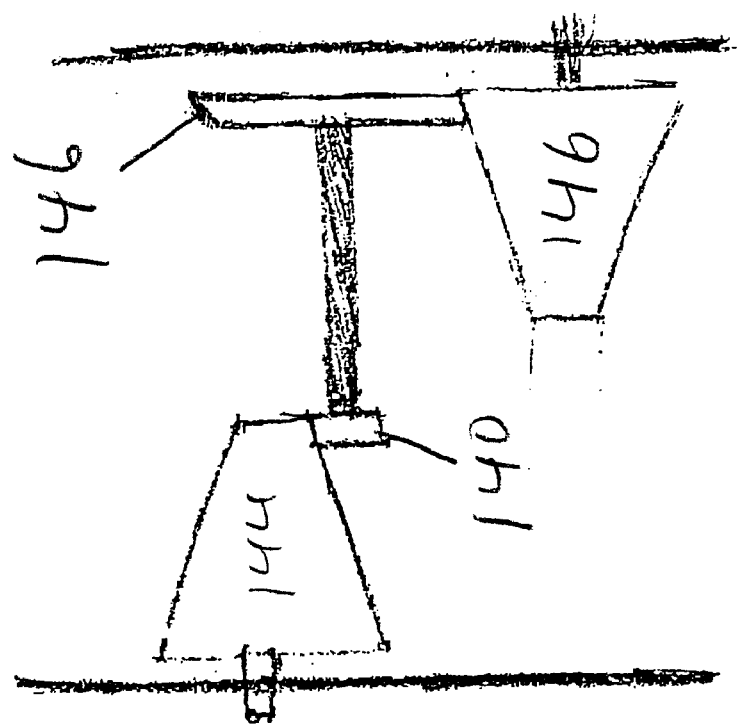
FIG. 12 is a schematic view of high gear for the transmission of FIG. 9 according to the present invention.
Figure 11:
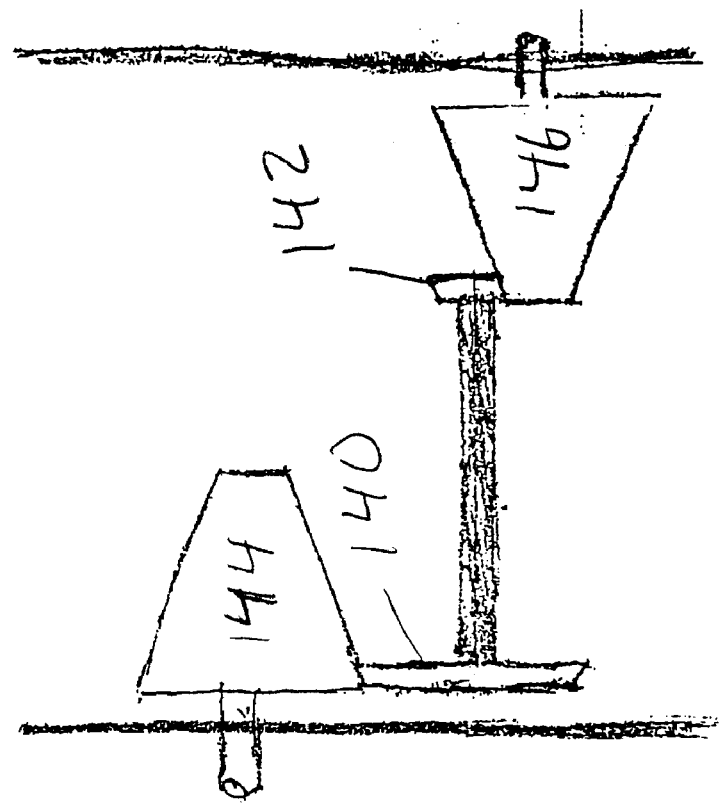
FIG. 11 is a schematic view of low gear for the transmission of FIG. 9 according to the present invention.

FIGS. 10–12 show the use of two CVGs mounted on a shaft to create a multi-ratio CVT. The CVT shown in FIG. 10 uses multiple dual CVGs arranged as a gear train, to provide a useable ratio for modern cars. As shown in FIG. 10, the conical gear 100 receives an input from input shaft 102. The conical gear 100 rotates CVG 104. CVG 104 is connected to CVG 106 by a shaft 108 and CVG 106 rotates conical gear 110. Conical gear 110 is connected to conical gear 112 by a shaft 114 and conical gear 112 rotates CVG 116. CVG 116 is connected to CVG 118 by a shaft 120 and CVG 118 rotates conical gear 122. Conical gear 122 is connected to conical gear 124 by a shaft 126 and conical gear 124 rotates CVG 128. CVG 128 is connected to CVG 130 by a shaft 132 and CVG 130 rotates conical gear 134. Conical gear 134 is connected to an output shaft 136, which can be connected to different external gear trains to determine the effect of the rotation of the output shaft 136. In effect, conical gear 100 and CVG 104 are the same as the input conical gear 18 and CVG 24 of FIG. 1 and conical gear 134 and CVG 130 are the same as the output conical gear 36 and CVG 42 of FIG. 1. Wherein, conical gears 110, 112, 122, 124, CVGs 106, 116, 118, 128, and shafts 108, 114, 120, 126, 132 act as a transfer unit. FIG. 10 shows a ram 138 connected to shaft 108. The ram 138 moves the CVGs 104, 106 in relation to conical gears 100, 110 to change the gear ratio of the CVT, allowing for high and low gearing of the CVT. FIG. 11 shows the position of a set of CVGs 140, 142 and conical gears 144, 146 for a low gear situation. FIG. 12 shows the position of a set of CVGs 140, 142 and conical gears 144, 146 for a high gear situation.

While different embodiments of the invention have been described in detail herein, it will be appreciated by those skilled in the art that various modifications and alternatives to the embodiments could be developed in light of the overall teachings of the disclosure. Accordingly, the particular arrangements are illustrative only and are not limiting as to the scope of the invention that is to be given the full breadth of any and all equivalents thereof.

I claim:

1. A transmission comprising:
   an input to be connected to a power source;
   at least one conical shaped gear;
   at least one variable ratio gear, said at least one variable ratio gear engaged with said at least one conical shaped gear, said at least one variable ratio gear able to change gear size along said at least one conical shaped gear, said at least one variable ratio gear is a ring shape, said at least one variable ratio gear includes adjustable gear teeth which extend outward around said ring shape and are adjustable to change the gear size of said at least one variable ratio gear; and
   at least one variable ratio gear adjustment device for each of said at least one variable ratio gear to interact internally within said at least one variable ratio gear to change said gear size, said variable ratio gear adjustment device linked to said adjustable gear teeth to adjust gear size of said at least one variable ratio gear by movement of said adjustable gear teeth.

2. The transmission of claim 1, wherein said at least one variable ratio gear is a ring shaped collar with an open center; wherein said at least one variable ratio gear adjustment device is a conical shaped device which inserts into said open center of said collar, such that said collar moves along a height of said conical shaped device to change gear size; and wherein said variable ratio gear adjustment device is linked to said adjustable gear teeth which adjust in size based on movement of said collar along said conical shaped device.

3. The transmission of claim 2, wherein said conical shaped device includes pin slots running along said height of said conical shaped device; wherein said collar includes a plurality of ring slots through and about said ring; wherein said adjustable gear teeth are sliding pins, each of said sliding pins having a slot end and a tooth end; wherein each of said sliding pins are slidably inserted into said ring slots to form said adjustable teeth and are movable in said ring slots; wherein said slot end of each of said sliding pins engages one of said pin slots of said conical shaped device; wherein said tooth end of each of said sliding pins extends outward from said collar to engage said at least one conical shaped gear.

4. The transmission of claim 2, wherein said at least one conical shaped gear is a conically shaped helical gear.

5. The transmission of claim 3, wherein said at least one conical shaped gear is a conically shaped helical gear.

6. A transmission comprising:
a transmission housing;
an input inside said transmission housing to be connected to a power source;
an input conical shaped gear inside said transmission housing connected to said input;
an input variable ratio gear inside said transmission housing, said input variable ratio gear engaged with said input conical shaped gear, said input variable ratio gear able to change gear size along said input conical shaped gear;
an input variable ratio gear adjustment device which interacts with said input variable ratio gear to change said gear size;
an input transfer gear connected to and rotating with said input variable ratio gear;
an output inside said transmission housing to be connected to a load;
an output conical shaped gear inside said transmission housing connected to said output;
an output variable ratio gear inside said transmission housing, said output variable ratio gear engaged with said output conical shaped gear, said output variable ratio gear able to change gear size along said output conical shaped gear;
an output variable ratio gear adjustment device which interacts with said output variable ratio gear to change said gear size;
an output transfer gear connected to and rotating with said output variable ratio gear; and
wherein said input and output transfer gears are interconnected such that rotation of said input produces rotation of said output.

7. The transmission of claim 6, wherein said input and output variable ratio gears each are a ring shaped collar with an open center; wherein said input and output variable ratio gears each include adjustable gear teeth which change the gear size of said input and output variable ratio gears; wherein said input and output variable ratio gear adjustment devices are each a conical shaped device which inserts into said open center of said collar, such that said collar moves along a height of said conical shaped device to change gear size; and wherein said input and output variable ratio gear adjustment devices are each linked to said adjustable gear teeth which adjust in size based on movement of said collar along said conical shaped device.

8. The transmission of claim 7, wherein said conical shaped device includes pin slots running along said height of said conical shaped device; wherein said collar includes a plurality of ring slots through and about said ring; wherein said adjustable gear teeth are sliding pins, each of said sliding pins having a slot end and a tooth end; wherein each of said sliding pins are slidably inserted into said ring slots to form said adjustable teeth and are movable in said ring slots; wherein said slot end of each of said sliding pins engages one of said pin slots of said conical shaped device; wherein said tooth end of each of said sliding pins extends outward from said collar to engage said at least one conical shaped gear.

9. The transmission of claim 7, wherein said at least one conical shaped gear is a conically shaped helical gear.

10. The transmission of claim 8, wherein said at least one conical shaped gear is a conically shaped helical gear.

11. The transmission of claim 8, wherein said input and output transfer gears are interconnected by a gear train of at least two interconnected gears.

12. The transmission of claim 8, wherein said transmission housing includes guide track for each of said input and output variable ratio gears to allow lateral movement of said input and output variable ratio gears during changing of said gear size.

13. A transmission comprising:
a transmission housing;
an input inside said transmission housing to be connected to a power source;
an input conical shaped gear inside said transmission housing connected to said input;
an input variable ratio gear inside said transmission housing, said input variable ratio gear engaged with said input conical shaped gear, said input variable ratio gear able to change gear size along said input conical shaped gear, said input variable ratio gear is a ring shape, said input variable ratio gear includes adjustable gear teeth which extend outward around said ring shape and are adjustable to change the gear size of said input variable ratio gear;
an input variable ratio gear adjustment device to interact internally within said input variable ratio gear to change said gear size, said variable ratio gear adjustment device linked to said adjustable gear teeth to adjust gear size of said input variable ratio gear by movement of said adjustable gear teeth;
an output inside said transmission housing to be connected to a load;
an output conical shaped gear inside said transmission housing connected to said output;
an output variable ratio gear inside said transmission housing, said output variable ratio gear engaged with said output conical shaped gear, said output variable ratio gear able to change gear size along said output conical shaped gear, said output variable ratio gear is a ring shape, said output variable ratio gear includes adjustable gear teeth which extend outward around said ring shape and are adjustable to change the gear size of said output variable ratio gear;
an output variable ratio gear adjustment device to interact internally within said output variable ratio gear to change said gear size, said variable ratio rear adjustment device linked to said adjustable gear teeth to adjust gear size of said output variable ratio gear by movement of said adjustable gear teeth; and
a transfer unit interconnected between said input and output variable ratio gears, said transfer unit comprising:
a first transfer shaft having a first and second end, said first end connected to said input variable ratio gear;
a first transfer variable ratio gear connected to said second end of said first transfer shaft, said first transfer variable ratio gear is a ring shape, said first transfer variable ratio gear includes adjustable gear teeth which extend outward around said ring shape and are adjustable to change the gear size of said first transfer variable ratio gear;

first transfer variable ratio gear adjustment device to interact internally within said first transfer variable ratio gear to change said gear size, said variable ratio gear adjustment device linked to said adjustable gear teeth to adjust gear size of said first transfer variable ratio gear by movement of said adjustable gear teeth;

a first transfer conical shaped gear engaged with said first transfer variable ratio gear, said first transfer variable ratio gear able to change gear size along said first transfer conical shaped gear;

a second transfer shaft having a first and second end, said first end connected to said first transfer conical shaped gear;

a second transfer conical shaped gear connected to said second end of said second transfer shaft;

a second transfer variable ratio gear engaged with said second transfer conical shaped gear, said second transfer variable ratio gear able to change gear size along said second transfer conical shaped gear, said second transfer variable ratio gear is a ring shape, said second transfer variable ratio gear includes adjustable gear teeth which extend outward around said ring shape and are adjustable to change the gear size of said second transfer variable ratio gear;

a second transfer variable ratio gear adjustment device to interact internally within said second transfer variable ratio gear to change said gear size, said variable ratio gear adjustment device linked to said adjustable gear teeth to adjust gear size of said second transfer variable ratio gear by movement of said adjustable gear teeth; and a third transfer shaft having a first and second end, said first end connected to said second transfer variable ratio gear and said second end connected to said output variable ratio gear.

14. The transmission of claim 13, wherein said transfer unit further includes at least one more set of two additional transfer shafts interconnected between said input and output variable ratio gears, wherein a first additional transfer shaft of said additional transfer shafts of said set includes a transfer conical shaped gear attached to each end of said first additional transfer shaft, and wherein a second additional transfer shaft of said additional transfer shafts of said set includes a transfer variable ratio gear attached to each end of said second additional transfer shaft, wherein there is an additional transfer variable ratio gear adjustment device associated with each of said additional set of two additional transfer shafts.

15. The transmission of claim 13, wherein said variable ratio gears each are a ring shaped collar with an open center; wherein said variable ratio gears each include adjustable gear teeth which change the gear size of said variable ratio gears; wherein said variable ratio gear adjustment devices are each a conical shaped device which inserts into said open center of said collar, such that said collar moves along a height of said conical shaped device to change gear size; and wherein said variable ratio gear adjustment devices are each linked to said adjustable gear teeth which adjust in size based on movement of said collar along said conical shaped device.

16. The transmission of claim 15, wherein said conical shaped device includes pin slots running along said height of said conical shaped device; wherein said collar includes a plurality of ring slots through and about said ring; wherein said adjustable gear teeth are sliding pins, each of said sliding pins having a slot end and a tooth end; wherein each of said sliding pins are slidably inserted into said ring slots to form said adjustable teeth and are movable in said ring slots; wherein said slot end of each of said sliding pins engages one of said pin slots of said conical shaped device; wherein said tooth end of each of said sliding pins extends outward from said collar to engage said at least one conical shaped gear.

17. The transmission of claim 15, wherein said conical shaped gears are each a conically shaped helical gear.

18. The transmission of claim 16, wherein said conical shaped gears are each a conically shaped helical gear.

19. The transmission of claim 14, wherein said variable ratio gears each are a ring shaped collar with an open center; wherein said variable ratio gears each include adjustable gear teeth which change the gear size of said variable ratio gears; wherein said variable ratio gear adjustment devices are each a conical shaped device which inserts into said open center of said collar, such that said collar moves along a height of said conical shaped device to change gear size; and wherein said variable ratio gear adjustment devices are each linked to said adjustable gear teeth which adjust in size based on movement of said collar along said conical shaped device.

20. The transmission of claim 19, wherein said conical shaped device includes pin slots running along said height of said conical shaped device; wherein said collar includes a plurality of ring slots through and about said ring; wherein said adjustable gear teeth are sliding pins, each of said sliding pins having a slot end and a tooth end; wherein each of said sliding pins are slidably inserted into said ring slots to form said adjustable teeth and are movable in said ring slots; wherein said slot end of each of said sliding pins engages one of said pin slots of said conical shaped device; wherein said tooth end of each of said sliding pins extends outward from said collar to engage said at least one conical shaped gear.

* * * * *